Figure 1:
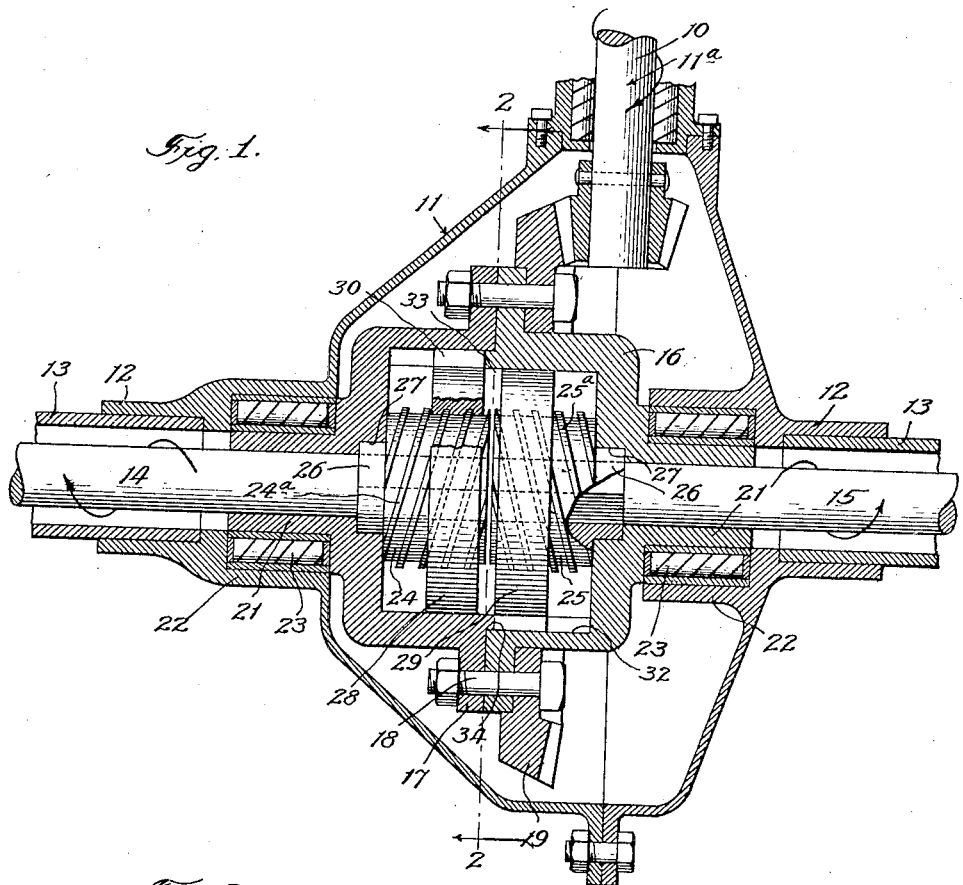

W. H. BROWN.
DIFFERENTIAL MOTION MECHANISM.
APPLICATION FILED MAY 31, 1917.

1,329,159.

Patented Jan. 27, 1920.

Witnesses:
Irwin C. Bowman.
Geo. H. Buell.

Inventor:
William H. Brown,
By Poole & Warn
Attys.

UNITED STATES PATENT OFFICE.

WILLIAM H. BROWN, OF CHICAGO, ILLINOIS.

DIFFERENTIAL-MOTION MECHANISM.

1,329,159.   Specification of Letters Patent.   Patented Jan. 27, 1920.

Application filed May 31, 1917.   Serial No. 171,884.

*To all whom it may concern:*

Be it known that I, WILLIAM H. BROWN, a citizen of the United States, residing at Chicago, in the county of Cook and State of Illinois, have invented new and useful Improvements in Differential-Motion Mechanism, of which the following is a specification.

This invention relates to improvements in "differential motion mechanism," and more particularly to a novel construction for mechanism of that character suitable for use in motor driven vehicles and the like.

Persons familiar with mechanics are well aware that the purpose of a differential motion mechanism is to transmit power from a single driving shaft to two or more separate driven shafts, and at the same time permit one of the shafts to rotate at a greater or less speed than the other. As applied to motor driven vehicles such a mechanism is interposed between the main drive shaft and the driven shafts upon which are mounted the rear or driving wheels, said wheels and shafts being capable of rotating independently of each other. The function of the differential mechanism is to permit one wheel to turn or rotate faster than the other, when the vehicle is moving in a curvilinear path, as for instance in turning a corner, the power being applied entirely through the slower turning wheel, where as the faster turning wheel rotates freely until movement in a straight path is resumed. The purpose of a differential mechanism in motor vehicles is too well known to be further disclosed in detail.

The purpose of this invention is to provide a differential mechanism embodying certain novel features of construction calculated to improve the manner in which power is transmitted, and likewise the operation of the vehicle or other device to which it is applied. The invention is herein illustrated and described as embodying the features of design ordinarily employed in the construction of motor vehicles, although the novel features set forth are equally applicable to other mechanical devices.

Figure 2:
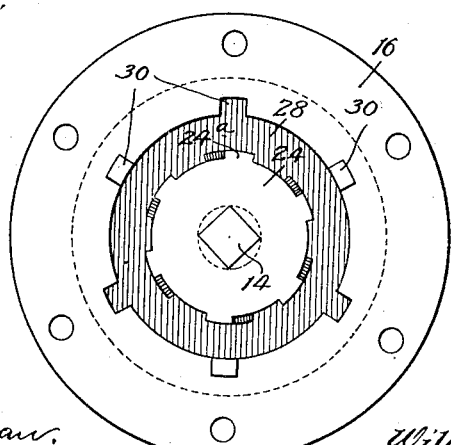

In the drawings:

Figure 1 is a view in horizontal section taken through the differential mechanism embodying the features of the invention, and, Fig. 2 is a cross sectional view taken on line 2—2 of Fig. 1.

Referring first to the general or main elements of the differential motion mechanism, the shaft 10, hereinafter termed the driving shaft, extends rearwardly from the motor of the vehicle and transmits the power therefrom to the rear drive wheels through the medium of the differential mechanism. The driving shaft 10 extends at right angles to the rear axle of the vehicle and terminates within a housing 11, surrounding the differential mechanism and forming the central portion of the rear axle, there being provided a suitable bearing 11ª at the point of entrance. The housing is generally cylindric in form arranged concentrically with the axle having integral tubular sleeves 12, 12 extending from opposite sides thereof, in which are secured the ends of tubular members 13, 13, forming the rear axle proper. Mounted within the tubular members 13, 13 of the rear axle and terminating within this housing 11, are the driven shafts 14 and 15, there being fixed or mounted upon the outer ends of said driven shafts, the rear or driving wheels of the vehicle.

Referring now more in detail to the mechanism interposed between the driving shaft 10 and the driven shafts 14 and 15, the same comprises a hollow cylindrical drum or casing 16, mounted within the housing 11 and arranged to rotate about an axis coinciding with the axis of the driven shafts 14 and 15. The drum or casing 16 is preferably constructed of two halves, joined together by means of bolts 18 extending through marginal flanges 17. Surrounding the central portion of the drum is a gear wheel 19, preferably attached to the casing by means of the bolts 18, which extend through the inner peripheral portion of the gear wheel, as well as the flanges 17, 17. Fixed to the end of the drive shaft 10, is a pinion 20, which meshes with the gear wheel 19, said pinion and gear wheel being preferably of the beveled or spiral type.

The casing or drum 16 is rotatively mounted within the housing 11 in the following manner: Extending outwardly from opposite end walls of the casing are provided annular bearing sleeves 21, 21, projecting into the sleeves 22, 22 of the housing 11, there being provided annular spaces between the surfaces of said sleeves within which are mounted rolling bearings 23, 23. The sleeves 21, 21 surround or are mounted on the driving shafts 14 and 15 extending therethrough and into the cylindric shaped space within the casing 16, the ends of said driving shafts terminating in close proximity and at the center of said casing. The inner or adjacent end portions of the driving shafts 14 and 15 are preferably square in cross sectional contour and have mounted thereon collars 24 and 25, respectively, extending lengthwise of their respective shafts from the inner ends thereof to the end walls of the casing. The collars 24 and 25 are provided with rectangular shaped aperture fitting the squared ends of the shafts, thus preventing the relative rotation between said collars and shafts. The collars are also provided on their outer faces with annular bearing hubs 26, 26 which engage similarly formed bearing depressions formed in the end walls of the casing. On the outer faces of the collars 24 and 25, respectively, are provided helical screw threads 24$^a$ and 25$^a$ of a predetermined pitch, the threads on one collar being right handed, namely the right-hand collar 25 and the threads on the other collar being left-handed.

Mounted upon and surrounding each of the threaded collars 24 and 25 are annular rings 28 and 29, respectively. Said rings have screw threaded engagement with their respective collars and are adapted to move endwise and axially thereof throughout a distance substantially equal to the width of said collars. The rings 28 and 29 are provided about their peripheries with a plurality of radially projecting lugs 30 extending transversely thereof and spaced about the rings at suitable intervals. These lugs 30 engage a series of longitudinal grooves or slots 31 and 32 formed in the inner annular surface of the casing 16, the slots 31 being located in that half of the casing occupied by the collar 24, and the slots 32 located in the half of the casing occupied by the collar 25, said slots furthermore extending from the end walls of the casing toward the center and terminate therefrom in shoulders 33 and 34, acting to limit the movement of the rings toward the center of the casing and axially of their respective collars 24 and 25.

From the description of the parts of the mechanism as thus described and as will be more clearly apparent from the description which follows the casing or drum 16 is, in fact, an intermediate driven member, which has positive driving connection with the main driving shaft 10 and as such is designed to be connected with either or both the driven shafts 14 and 15 through the medium of the threaded collars and shiftable rings, these last mentioned members being operative in such a manner as to constitute automatically operating clutch members inasmuch as the screw threaded engagement and relative rotation between the parts produces the endwise movement necessary to effect the frictional contact or locking engagement between the intermediate driven member or casing and the driven shafts. Thus it will be seen that the shifting rings and threaded collars partake of the nature of clutch members which are interposed between each driven shaft and the intermediate driven member, and which are operated entirely by the relative speeds of the wheels and said drum, as determined by the speed of the vehicle and the speed of the motor at a given instant or period of time.

Referring now to the operation of the differential movement mechanism as hereinbefore described, let it be first assumed that the driving shaft 10 is rotated in a counterclockwise direction as indicated by the arrow, this being the direction of rotation which would transmit power to the driven shafts 14 and 15, to drive the vehicle in a forward direction. Assuming further that the vehicle is moving forwardly in a straight path, power is transmitted from the driving shaft 10 positively to both the driven shafts 14 and 15 in the following manner: The casing 16 is rotated through the medium of the gear wheel 19 and pinion 20 and in the same direction as the driven shafts 14 and 15. The power, however, is not transmitted directly from the casing 16 to the driven shafts 14 and 15, but through the medium of the rings 28 and 29 and the threaded collars 24 and 25, as will be understood from the following: The rings 28 and 29 connected with the casing 16 by the lug and slot arrangement rotate with and at the same speed as the casing and also being mounted upon their respective collars 24 and 25 and having screw threaded connection therewith, the rotative movement of the rings produces relative endwise movement, or end thrust, the direction of the threads being such as to force the rings against the shoulders at the inner ends of the slot, thus preventing endwise movement and as a result the end thrust is exerted upon the collars 24 and 25 forcing them outwardly and in contact with the end walls of the casing 16, there being sufficient end play to permit this movement. It is manifest therefore that so long as power is transmitted uniformly to the casing in a direction to drive the vehicle forward, a frictional contact between the collars 24 and 25 and the end walls of the casing 16 is produced, thus connecting or locking said members together, to the end that the power is transmitted uniformly from the driving shaft to the driven shafts, so long as the vehicle continues in a straight path.

Now let it be assumed that the vehicle makes a turn, say, to the left, through an angle of 90° as in turning a corner, the power being applied continuously so that the casing 16 rotates at the same speed.

Under these conditions the inside or left wheel and its shaft 14 will rotate or turn at the same rate of speed as the casing 16, and thus the power will be transmitted through the casing and the intermediate ring and collar 28 and 24 in the same manner as in driving a straight path. The right-hand wheel, however, inasmuch as it describes an arc of greater radius than the inside or left hand wheel must necessarily travel a greater distance in making the turn, and hence must rotate at a greater speed than the inside wheel. This being so, it follows that the shaft 15 of the outside wheel would be turned at a greater speed than the casing 16, or in other words, it would "run ahead" of the casing. The effect of this variable speed results in the relative rotation of the threaded collar 25 within its ring 29 (inasmuch as the latter is rotating with the casing 16 and therefore at a slower speed than the collar) with the result that the ring 29 is shifted toward the outer end of the collar 25 due to the right hand direction of the threads. The amount which the ring 29 is shifted will depend upon the number of rotations which the outer wheel gains over the inner wheel in making the turn, thus if the outer wheel gains one revolution, the ring will be shifted outwardly, a distance equal to the pitch of the threads and so on. It is to be noted also that at the instant the shaft 15 begins to revolve faster than the casing 16, that is to run ahead, the end thrust is released, thus destroying the frictional contact between the collar 25 and the casing 16, and disconnecting the driven shaft 15 so that it is free to rotate independently of the casing. After the vehicle has made the turn and assumes a straight path, it is manifest that the speed of rotation of the driven shafts 14 and 15, as well as the casing 16 again become uniform, attention being called to the fact that the ring 29 of the right hand driven shaft 15 remains out of contact with the shoulders formed at the ends of the slots 32, inasmuch as the shafts 15 and the casing 16 are rotating at the same velocity and hence no relative endwise movement can take place between the ring 29 and the collar 25. With the parts thus arranged, all of the power is delivered to the left hand driven shaft 14, a condition which continues until the ring 29 returns to the center of the casing, or, in other words, until the right hand wheel drops back sufficiently to permit the left hand wheel to catch up with it. In ordinary driving, the unevenness of the road or slippage of the wheels upon the pavement permits the right hand wheel to "drop-back" so that power will again be transmitted uniformly to both wheels. The same results are obtained if the vehicle is turned to the right, whereupon the left hand would be permitted to run ahead of the right hand wheel, the parts associated with the former acting in the same manner as above disclosed.

In addition to providing for the variation in the speed of the wheels that follows the movement of the vehicle in the curvilineal path, the differential mechanism serves other purposes when the vehicle is moving in a straight path, namely, under slippery conditions of the road, as will be understood from the following: Ordinarily the rear wheels of a vehicle equipped with the ordinary differential mechanism on encountering a slippery portion of the pavement, will revolve at different speeds, one wheel spinning rapidly, the other more slowly, or even sliding on the pavement without turning. In other words, the wheel which is spinning and therefore useless is receiving the power, whereas the other wheel is running free without exerting any power. With the present form of mechanism the wheel which would otherwise tend to spin would be instantly disconnected from the power, because it would run ahead of the other wheel, and the latter being the slow-running wheel would continue to turn under power, thus carrying the vehicle over the slippery pavement without loss of momentum, the particular advantage gained therefor, is the elimination of the spinning of the wheels in contact with the pavement and the loss of forward momentum, both being instrumental in promoting side movement or skidding of the vehicle.

Among the features of the differential mechanism herein described, is, first, the simplicity and small number of parts thereof, making the device comparatively inexpensive and at the same time of sufficient strength to withstand hard usage, and secondly the elimination of the large number of pinions which ordinarily comprise the usual type of differential gearing, and hence the noise and excessive friction that is present.

The invention whereby the novel features and advantages result, which are hereinbefore mentioned, among others, is more specifically pointed out in the appended claim.

I claim as my invention:

A differential motion mechanism, comprising a driving shaft, two separate driven shafts, a hollow casing rotatably mounted on said driven shafts and inclosing the opposed ends thereof and driven by said driving shaft, two collars located in said casing, one mounted on and rotative with each driven shaft, and two shift rings located in said casing, one for each collar and having screw-threaded engagement therewith, so that said shift rings may be moved toward and from each other, each ring being provided with radially projecting lugs for engaging longitudinal slots formed in the inner surface of said casing; the inner ends of said slots terminating in shoulders intermediate said shift rings and frictionally engaging the side faces thereof, when said shift rings have been moved into contact with said shoulders.

In witness that I claim the foregoing as my invention, I affix my signature in the presence of two witnesses, this 26th day of May, A. D. 1917.

WILLIAM H. BROWN.

Witnesses:
CHARLES H. POOLE,
CLARA L. PEOPLES.